(12) United States Patent
Inoue

(10) Patent No.: US 7,619,688 B2
(45) Date of Patent: Nov. 17, 2009

(54) BROADCAST-DATA DISPLAY CONTROL DEVICE AND METHOD, AND BROADCAST-DATA RECEIVING DEVICE

(75) Inventor: Taku Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 695 days.

(21) Appl. No.: 11/268,239

(22) Filed: Nov. 7, 2005

(65) Prior Publication Data

US 2006/0098002 A1 May 11, 2006

(30) Foreign Application Priority Data

Nov. 9, 2004 (JP) ............................. 2004-325059

(51) Int. Cl.
*H04N 5/44* (2006.01)
*G06G 5/00* (2006.01)

(52) U.S. Cl. ...................................... 348/569; 715/716
(58) Field of Classification Search ......... 348/563–567, 348/569; 715/716
See application file for complete search history.

(56) References Cited

U.S. PATENT DOCUMENTS

| | | | | |
|---|---|---|---|---|
| 6,236,395 B1 * | 5/2001 | Sezan et al. ................. | 715/723 |
| 6,320,623 B1 * | 11/2001 | Cavallerano et al. ........ | 348/553 |
| 7,068,323 B2 * | 6/2006 | Lee et al. ..................... | 348/569 |
| 7,124,365 B2 * | 10/2006 | Cavallerano et al. ........ | 715/716 |
| 7,289,158 B2 * | 10/2007 | Ichifuji et al. ............... | 348/563 |
| 7,304,685 B2 * | 12/2007 | Park et al. .................... | 348/556 |
| 2002/0097339 A1 * | 7/2002 | Kwon .......................... | 348/569 |
| 2002/0191108 A1 * | 12/2002 | Ko .............................. | 348/569 |

FOREIGN PATENT DOCUMENTS

| | | |
|---|---|---|
| JP | 11 225296 | 8/1999 |
| JP | 2000 270293 | 9/2000 |
| JP | 2000 308026 | 11/2000 |
| JP | 2002 112238 | 4/2002 |
| JP | 2002 320160 | 10/2002 |
| JP | 2004-187216 | 7/2004 |

\* cited by examiner

*Primary Examiner*—Paulos M Natnael
(74) *Attorney, Agent, or Firm*—Frommer Lawrence & Haug LLP; William S. Frommer; Thomas F. Presson

(57) ABSTRACT

A display control device includes the following elements. A related data acquisition unit acquires related data of a predetermined channel from a broadcast signal. A supplementary screen generator generates a supplementary screen indicating an overview of a related data display screen on the basis of the related data. A related data storage unit stores the supplementary screen generated by the supplementary screen generator. An event detector detects a predetermined event. A display controller controls the supplementary screen stored in the related data storage unit to be displayed upon detecting the predetermined event by the event detector.

14 Claims, 13 Drawing Sheets

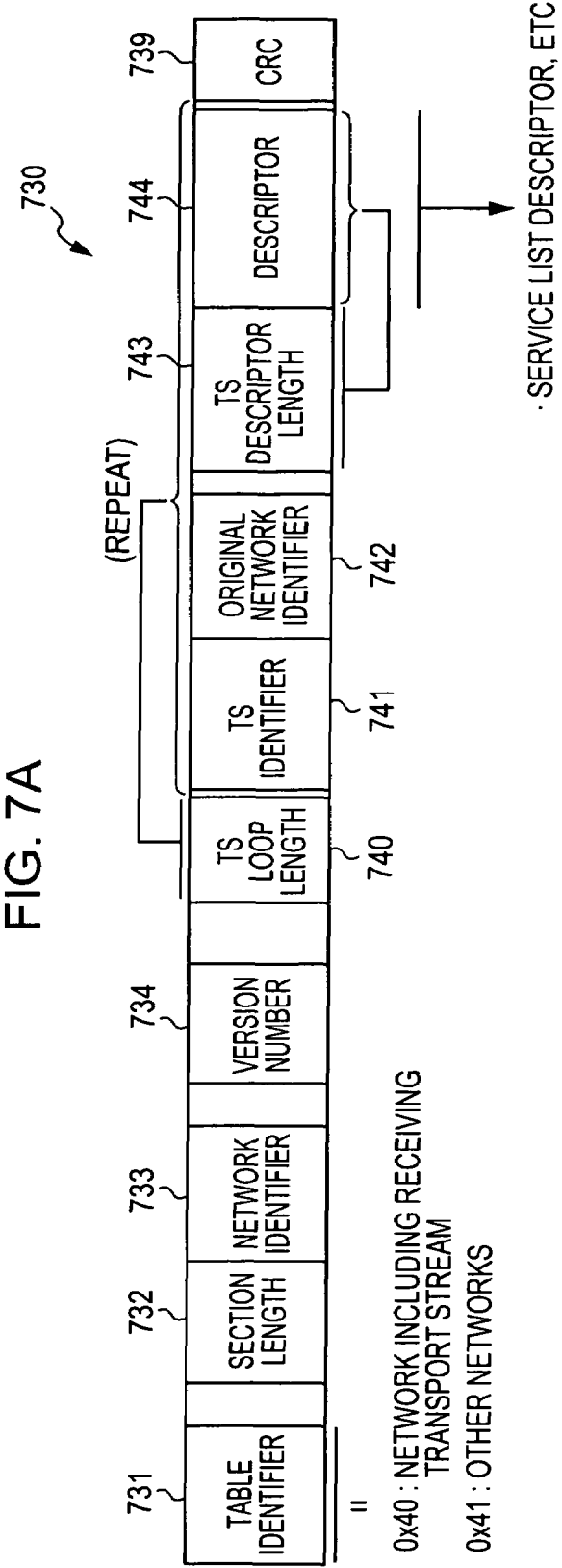
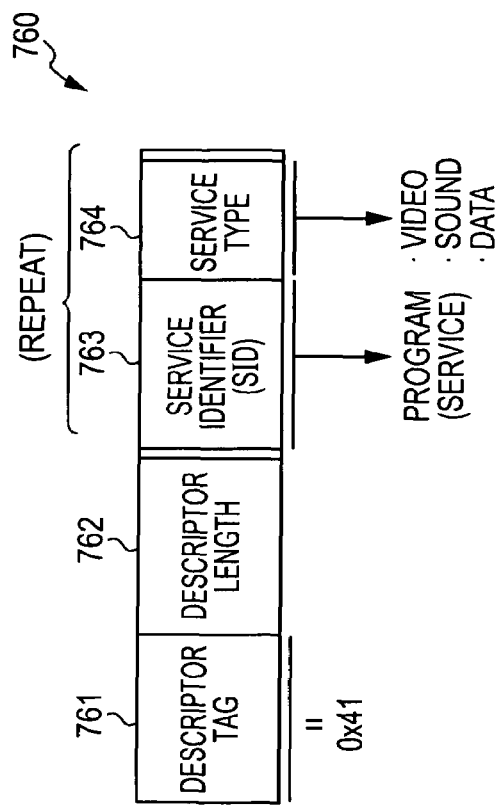

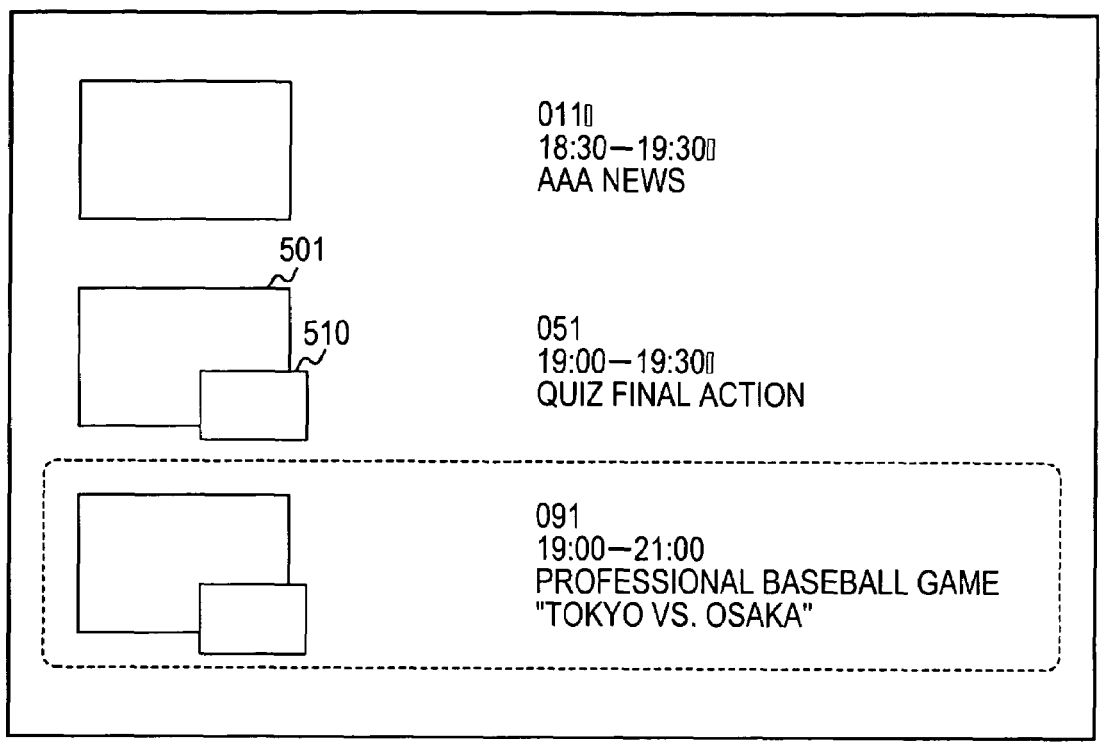
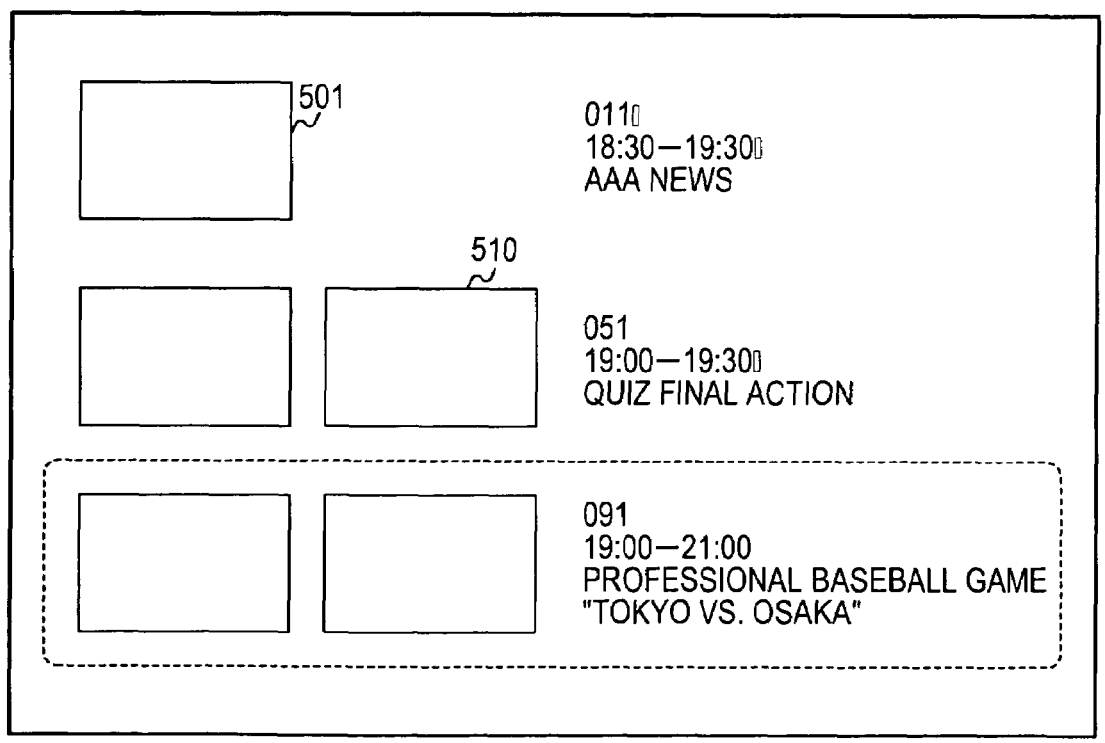

BROADCAST-DATA DISPLAY CONTROL DEVICE AND METHOD, AND BROADCAST-DATA RECEIVING DEVICE

CROSS REFERENCES TO RELATED APPLICATIONS

The present invention contains subject matter related to Japanese Patent Application JP 2004-325059 filed in the Japanese Patent Office on Nov. 9, 2004, the entire contents of which are incorporated herein by reference.

BACKGROUND OF THE INVENTION

1. Field of the Invention

The present invention relates to broadcast data receiving devices, and more particularly, to a display control device and method for displaying program related data in digital broadcasting, a receiving device for receiving program related data in digital broadcasting, and a program allowing a computer to execute the display control method.

2. Description of the Related Art

In digital broadcasting, program related data associated with broadcast programs can be provided. The related data is used for providing supplementary information or additional information related to the content of each broadcast program to users. The related data includes characters, graphics, still images, moving pictures, and sound, and a predetermined time (for example, five seconds or more) for displaying the entire related data is required.

The following known device has been proposed in Japanese Unexamined Patent Application Publication No. 2001-157193 (FIG. 1). It is checked whether related data associated with a program that is being received (viewed) exists, and if related data is found, it is received and stored in a storage unit, and then, in response to a request from a user, the related data in the storage unit is read from the storage unit and is used.

SUMMARY OF THE INVENTION

In the above-described known device, related data is stored in the storage unit, independently of a request from a user, thereby improving the responsiveness when there is a request from the user. However, there may be some cases where the user requests program related data immediately after the user switches the program. In this case, data for displaying the entire related data is not sufficient, and it takes time to display the entire related data.

Additionally, it is difficult for the user to see the content of related data until the user presses a related data button to display the entire related data, which may be troublesome for some users. In particular, quite a number of users who are used to known analog broadcasting are not even aware of the existence of related data, and even if the related data contains important information, it is difficult to sufficiently exploit the functions unique to digital broadcasting if such related data is not used.

It is thus desirable to enhance the usability by providing an overview of related data to users at an early stage and to facilitate the use of the related data.

According to an embodiment of the present invention, there is provided a display control device including: a related data acquisition unit acquiring related data of a predetermined channel from a broadcast signal; a supplementary screen generator generating a supplementary screen indicating an overview of a related data display screen on the basis of the related data; a related data storage unit storing the supplementary screen generated by the supplementary screen generator; an event detector detecting a predetermined event; and a display controller controlling the supplementary screen stored in the related data storage unit to be displayed upon detecting the predetermined event by the event detector. With this configuration, the prestored supplementary screen can be immediately displayed according to a detected event.

The above-described predetermined channel may also include a channel other than a channel which is being received. With this arrangement, when switching from a channel which is being received to another channel, the corresponding supplementary screen can be immediately displayed.

The display control device may further include a channel list storage unit storing a channel list of channels included in the broadcast signal, in which case, the related data acquisition unit may acquire related data according to the channel list stored in the channel list storage unit.

The display control device may further include a program table storage unit storing a program table included in the broadcast signal, in which case, when acquiring related data according to the channel list stored in the channel list storage unit, if a predetermined time has reached to start a new program, the related data acquisition unit may preferentially acquire related data of a channel containing the new program.

The display control device may further include an operation input receiver receiving an input of an operation, in which case, the event detector may detect the predetermined event in accordance with the input of an operation received by the operation input receiver.

The event may occur, for example, when a screen display button, an input switch button, a volume button, a numeric button, or a channel button is pressed, or when a program which is being received is shifted to a commercial or is returned from a commercial.

The display control device may further include a mode storage unit storing a display mode for displaying the supplementary screen, in which case, the display controller may display the supplementary screen only when the display mode indicates that the supplementary screen is to be displayed. When the display mode indicates that the supplementary screen is to be automatically erased, the display controller may erase the supplementary screen after a predetermined lapse of time.

According to another embodiment of the present invention, there is provided a receiving device including: a receiver receiving a broadcast signal; a related data acquisition unit acquiring related data of a predetermined channel from the broadcast signal; a supplementary screen generator generating a supplementary screen indicating an overview of a related data display screen on the basis of the related data; a related data storage unit storing the supplementary screen generated by the supplementary screen generator; an event detector detecting a predetermined event; and a display controller controlling the supplementary screen stored in the related data storage unit to be displayed upon detecting the predetermined event by the event detector. With this configuration, the prestored supplementary screen corresponding to a broadcast signal can be immediately displayed according to a detected event.

The receiving device may further include a display unit displaying the supplementary screen under the control of the display controller.

According to another embodiment of the present invention, there is provided a display control method including the steps of: acquiring related data of a predetermined channel from a broadcast signal; generating a supplementary screen indicating an overview of a related data display screen on the basis of the related data; storing the generated supplementary screen; detecting a predetermined event; and controlling the stored supplementary screen to be displayed upon detecting the predetermined event. According to this method, the prestored supplementary screen can be immediately displayed according to a detected event.

According to another embodiment of the present invention, there is provided a program allowing a computer to execute the steps of: acquiring related data of a predetermined channel from a broadcast signal; generating a supplementary screen indicating an overview of a related data display screen on the basis of the related data; storing the generated supplementary screen; detecting a predetermined event; and controlling the stored supplementary screen to be displayed upon detecting the predetermined event. According to this program, the prestored supplementary screen can be immediately displayed according to a detected event.

According to an embodiment of the present invention, an overview of related data can be provided at an early stage, and the use of the related data can be facilitated.

BRIEF DESCRIPTION OF THE DRAWINGS

FIGS. 7A and 7B illustrate the configuration of a network information table (NIT);

FIGS. 11A and 11B illustrate other examples of the supplementary screen;

DESCRIPTION OF THE PREFERRED EMBODIMENTS

An embodiment of the present invention is described in detail below with reference to the accompanying drawings.

Figure 1:
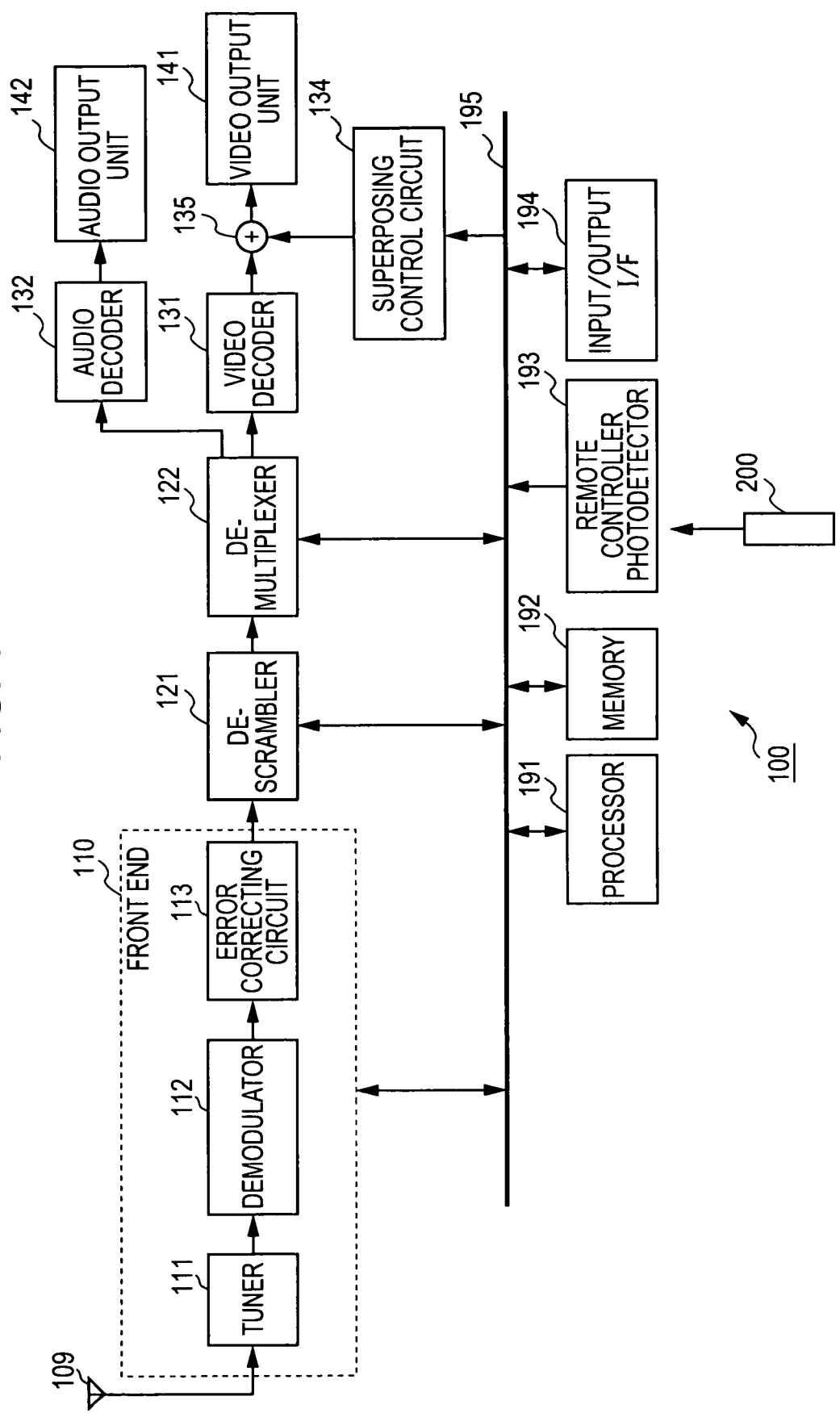
FIG. 1 is a block diagram illustrating the configuration of a receiving device according to an embodiment of the present invention.

FIG. 1 is a block diagram illustrating the configuration of a receiving device 100 according to an embodiment of the present invention. The receiving device 100 includes a front end 110, a descrambler 121, a demultiplexer 122, a video decoder 131, an audio decoder 132, a superposing control circuit 134, an image synthesizer 135, a video output unit 141, and an audio output unit 142. The front end 110, the descrambler 121, and the demultiplexer 122 are connected to a bus 195. A processor 191, a memory 192, a remote controller photodetector 193, and an input/output interface 194 are also connected to the bus 195.

The front end 110 receives a broadcast signal from an antenna 109 and extracts predetermined data from the signal. A description is given below, assuming that moving picture experts group (MPEG)-2 transport streams (TSs) are extracted as the data. The front end 110 includes a tuner 111, a demodulator 112, and an error correcting circuit 113.

The tuner 111 selects an intermediate frequency (IF) signal of a predetermined channel from the broadcast signal. The demodulator 112 demodulates the IF signal output from the tuner 111 into a digital signal. As the digital broadcasting coding method, octuple phase shift keying (8PSK), quadrature phase shift keying (QPSK), etc., is used. The error correcting circuit 113 performs error correction on the demodulated signal by using, for example, convolutional coding or block coding.

The descrambler 121 descrambles (decrypts) a scrambled signal (encrypted signal) into a decipherable form. The demultiplexer 122 demultiplexes a multiplexed signal (transport stream) into a video signal, an audio signal, and a data signal. The video signal, the audio signal, and the data signal are supplied to the video decoder 131, the audio decoder 132, and the memory 192, respectively.

The video decoder 131 and the audio decoder 132 decode the video signal and the audio signal, respectively, which has been coded by the MPEG-2 method. The superposing control circuit 134 outputs the planes of the data signal stored in the memory 192. The image synthesizer 135 combines the output from the video decoder 131 with the output from the superposing control circuit 134 and supplies the synthesized signal to the video output unit 141. The video output unit 141, which is, for example, a liquid crystal display (LCD), outputs the signal supplied from the image synthesizer 135 as an image. The audio output unit 142, which is, for example, a speaker, outputs the signal output from the audio decoder 132 as sound.

The processor 191 controls the individual elements of the receiving device 100 via the bus 195. The memory 192 is a work area for the processor 191 and stores the data signal separated by the demultiplexer 122. The remote controller photodetector 193 receives infrared signals from a remote controller 200 or transmits information concerning the operation performed on the remote controller 200 to the processor 191. The input/output interface 194 is used for connecting the receiving device 100 with another device by, for example, IEEE1394.

Figure 2:
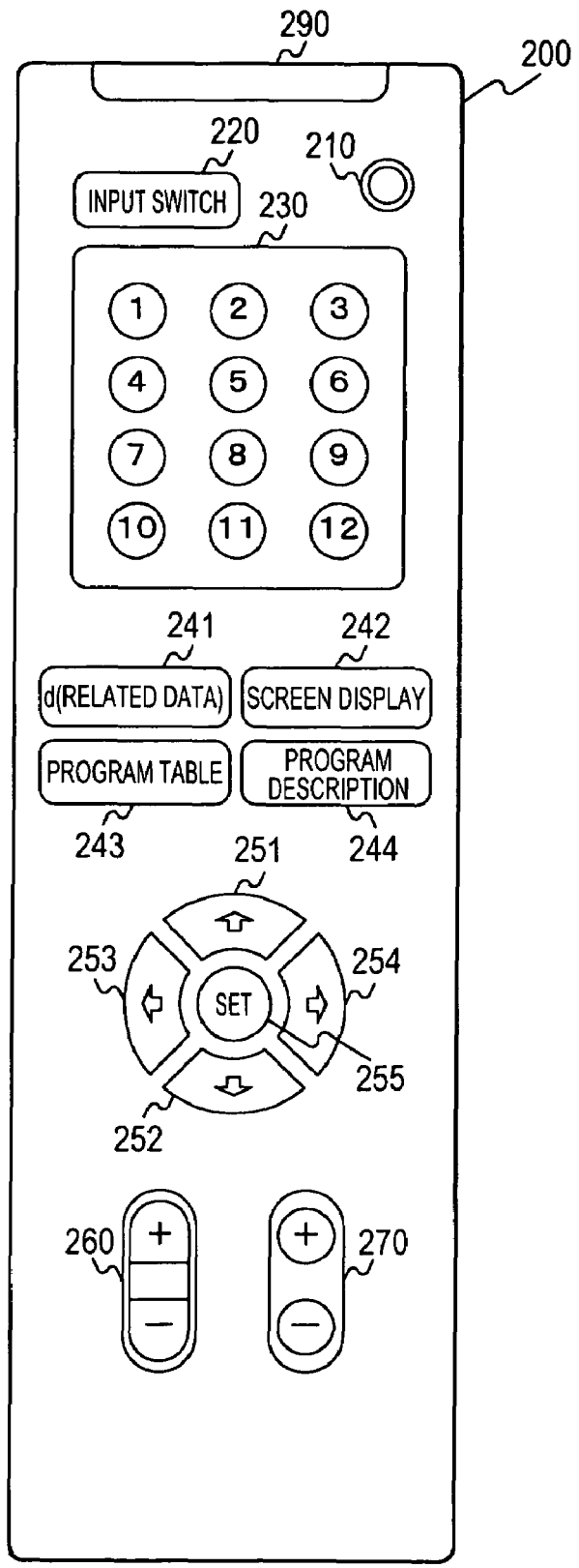
FIG. 2 illustrates the external view of a remote controller.

FIG. 2 is an external view illustrating the remote controller 200. The remote controller 200 includes a power button 210, an input switch button 220, a numeric button 230, a related data button 241, a screen display button 242, a program table button 243, a program description button 244, cursor moving buttons 251 through 254, a cursor setting button 255, a volume button 260, a channel button 270, and an infrared output unit 290.

The power button 210 is used for turning ON or OFF the power of the receiving device 100. The input switch button 220 is used for switching the input source in the receiving device 100 or in the video output unit 141 and the audio output unit 142. The numeric button 230 is used for inputting a reception channel as the number.

The related data button 241 is used for displaying related data associated with a broadcast program on the screen (i.e., the video output unit 141) and for erasing the display of the related data. The related data button 241 may be simply referred to as the "d button". The screen display button 242 is used for displaying a selected channel or program information on the screen and for erasing the display of such information. The program table button 243 is used for displaying a program table arranged according to the channel or the broadcast time and for erasing the display of the program table. The program description button 244 is used for displaying detailed information concerning the specified broadcast program on the screen and for erasing the display of the detailed information. The program description button 244 may be provided as a "program content button" or as one function of an "option button".

The cursor moving buttons 251 through 254 are used for moving the cursor or the selection button on the screen while related data or a program table is being displayed, and the cursor setting button 255 is used for setting the selection on the screen. The volume button 260 and the channel button 270 are used for increasing or decreasing the volume and the channel, respectively. The infrared output unit 290 outputs infrared to the remote controller photodetector 193 of the receiving device 100, and is generally disposed at the top edge of the remote controller 200.

Concerning the remote controller 200, the minimal buttons required for an embodiment of the present invention have been discussed. However, other buttons may be provided and the arrangement of the buttons on the remote controller 200 may be changed.

Figure 3:
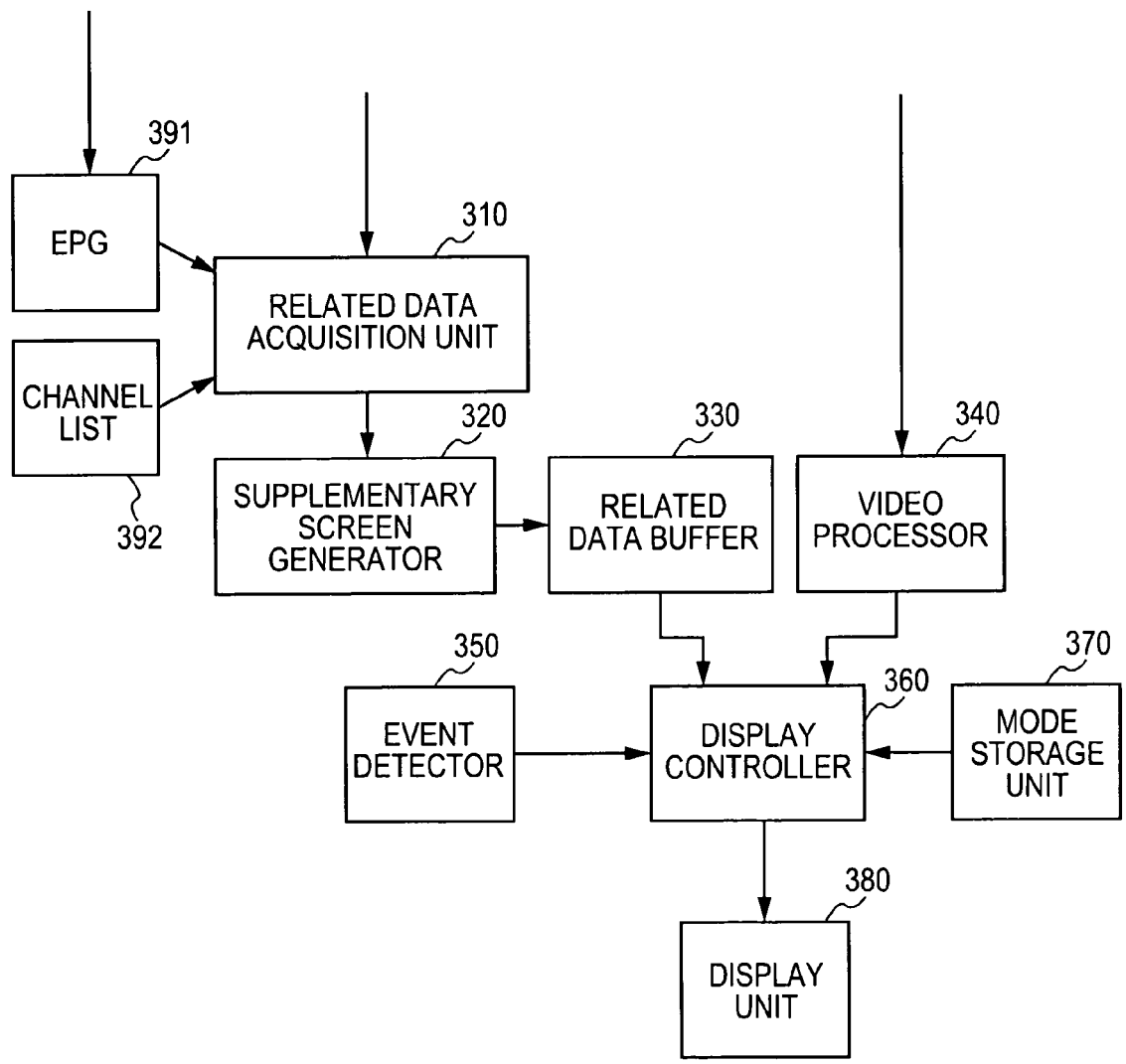
FIG. 3 is a block diagram illustrating the functional configuration of the receiving device.

FIG. 3 is a block diagram illustrating the functional configuration of the receiving device 100 according to an embodiment of the present invention. The receiving device 100 includes, as the functional elements, a related data acquisition unit 310, a supplementary screen generator 320, a related data buffer 330, a video processor 340, an event detector 350, a display controller 360, a mode storage unit 370, a display unit 380, an electronic program guide (EPG) 391, and a channel list 392.

The related data acquisition unit 310 acquires related data contained in a transport stream. In this case, the related data acquired is not restricted to the channel that is currently received, and the related data acquisition unit 310 acquires related data according to channel numbers indicated in the channel list 392. Alternatively, the related data acquisition unit 310 may acquire related data concerning channels other than the channel that is currently received. The channel list 392 stores channel numbers to be received, for example, in ascending order. The channel numbers in the channel list 392 may be listed in a predetermined order, for example, in the order from the higher viewing frequency to the lower viewing frequency.

If a predetermined time has reached to start a new program, the related data acquisition unit 310 may preferentially acquire the related data of the channel containing the new program. It can be determined whether a new program has started by referring to the EPG 391. The EPG 391 is a program table stored in a digital form by using program list information.

The supplementary screen generator 320 generates a supplementary screen that displays an overview of related data based on the related data obtained by the related data acquisition unit 310. The supplementary screen generated by the supplementary screen generator 320 is stored in the related data buffer 330 and is then supplied to the display controller 360.

The video processor 340 decodes a video signal contained in a transport stream. The decoded video signal is supplied to the display controller 360.

The event detector 350 is used for detecting a predetermined event to report the detected event to the display controller 360. An event occurs, for example, when the screen display button 242, the input switch button 220, the volume button 260, the numeric button 230, or the channel button 270 is pressed or when a program is shifted to a commercial or is returned from a commercial.

The display controller 360 controls the supplementary screen of the related data stored in the related data buffer 330 to be displayed on the display unit 380, together with the video signal decoded by the video processor 340, in accordance with the timing of the event detected by the event detector 350.

The mode storage unit 370 stores a display mode for displaying the supplementary screen of related data on the display unit 380. The display controller 360 displays the supplementary screen of the related data on the display unit 380 according to the display mode stored in the mode storage unit 370.

The related data acquisition unit 310 is implemented by the front end 110 and the processor 191. The supplementary screen generator 320 and the event detector 350 are implemented by the processor 191. The related data buffer 330, the mode storage unit 370, the EPG 391, and the channel list 392 are implemented by the memory 192. The video processor 340 is implemented by the video decoder 131. The display controller 360 is implemented by the superposing control circuit 134 and the image synthesizer 135. The display unit 380 is implemented by the video output unit 141.

Figure 4:
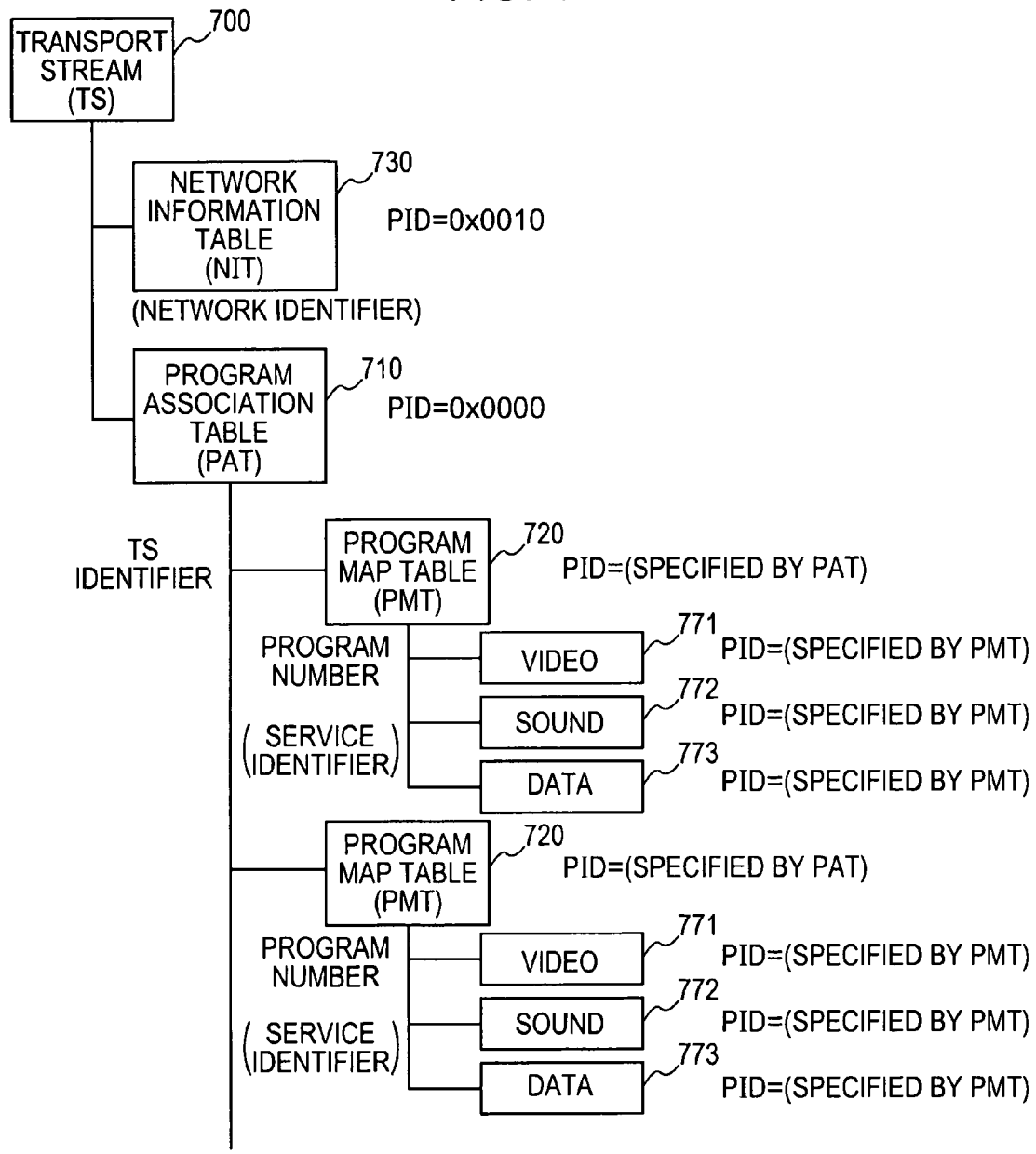
FIG. 4 illustrates the data structure of an MPEG-2 transport stream.

FIG. 4 illustrates the data structure of an MPEG-2 transport stream 700. Signals transmitted in the transport stream 700 includes, not only a video signal 771, an audio signal 772, and a data signal 773, but also control tables, which are referred to as program specific information (PSI), for defining the relationships between those signals and programs. The PSI includes a program association table (PAT) 710, program map tables (PMTs) 720, and a network information table (NIT) 730.

The program association table (PAT) 710 is provided for each transport stream (in this case, the transport stream 700) and indicates the types of programs included in the transport stream 700. The program map table (PMT) 720, which is provided for each program, specifies packet identifiers (PIDs) for identifying the video signal 771, the audio signal 772, and the data signal 773 contained in the program and the decoding methods for those signals. The packet identifiers (PIDs) of the program map table (PMT) 720 are specified by the program association table (PAT) 710.

The network information table (NIT) 730 indicates the type of service in the network containing the receiving transport stream 700 or in another network. In the MPEG-2 transport stream 700, programs and services are handled as synonyms.

Figure 5:
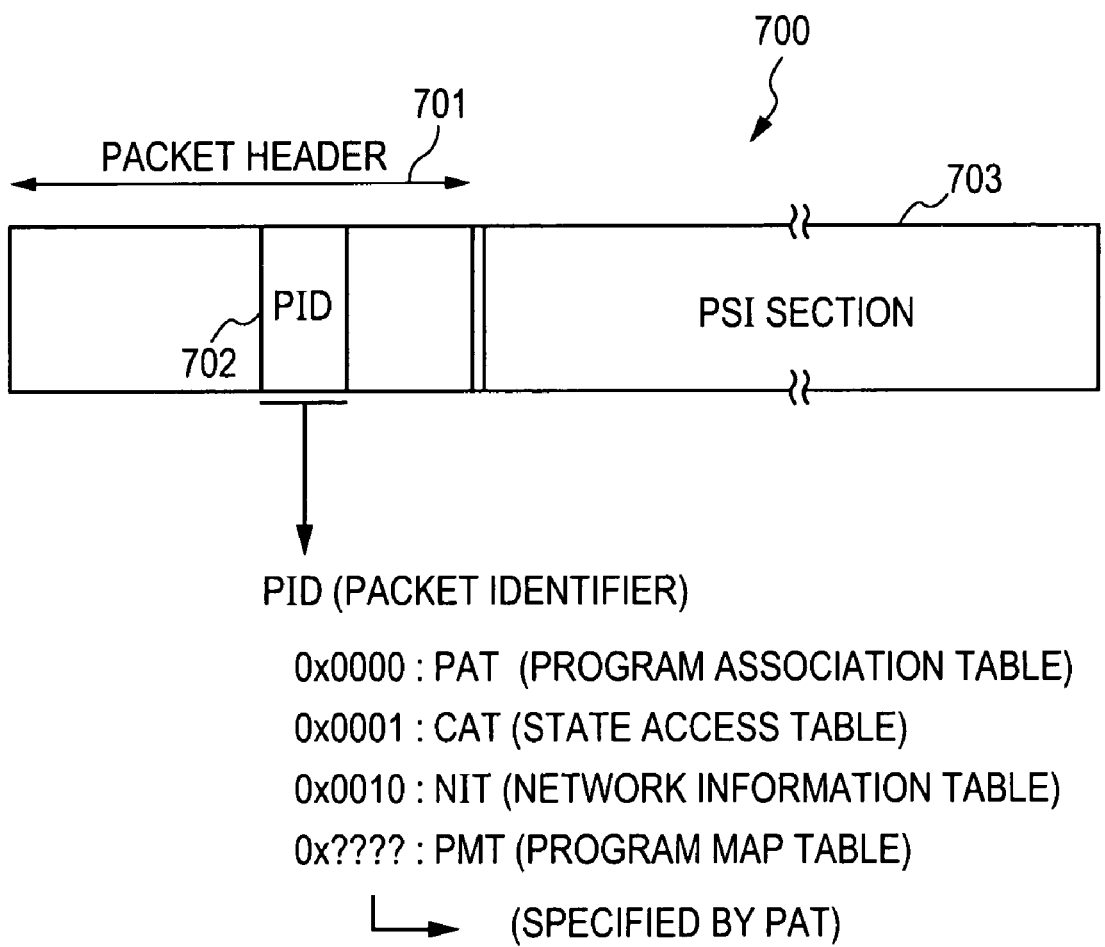
FIG. 5 illustrates the packet configuration of the transport stream.

FIG. 5 illustrates the packet configuration of the transport stream 700. The transport stream packet includes a packet header 701 and a payload. The packet header 701 contains, not only a synchronize bit and an error indicate bit, but also a packet identifier (PID) 702. The packet identifier (PID) 702 is to identify the transport stream packet; for example, the PID 702 is 0x0000 (0x indicates hexadecimal) for the program association table (PAT) 710 or indicates 0x0010 for the network information table (NIT) 730. The packet identifier (PID) 702 of the program map table (PMT) 720 is specified by the program association table (PAT) 710, as discussed below.

If the packet identifier (PID) 702 indicates one of the above-described tables, a program specific information (PSI) section 703, and more specifically, the table indicated in the packet identifier (PID) 702, is stored in the payload.

Figure 6A:
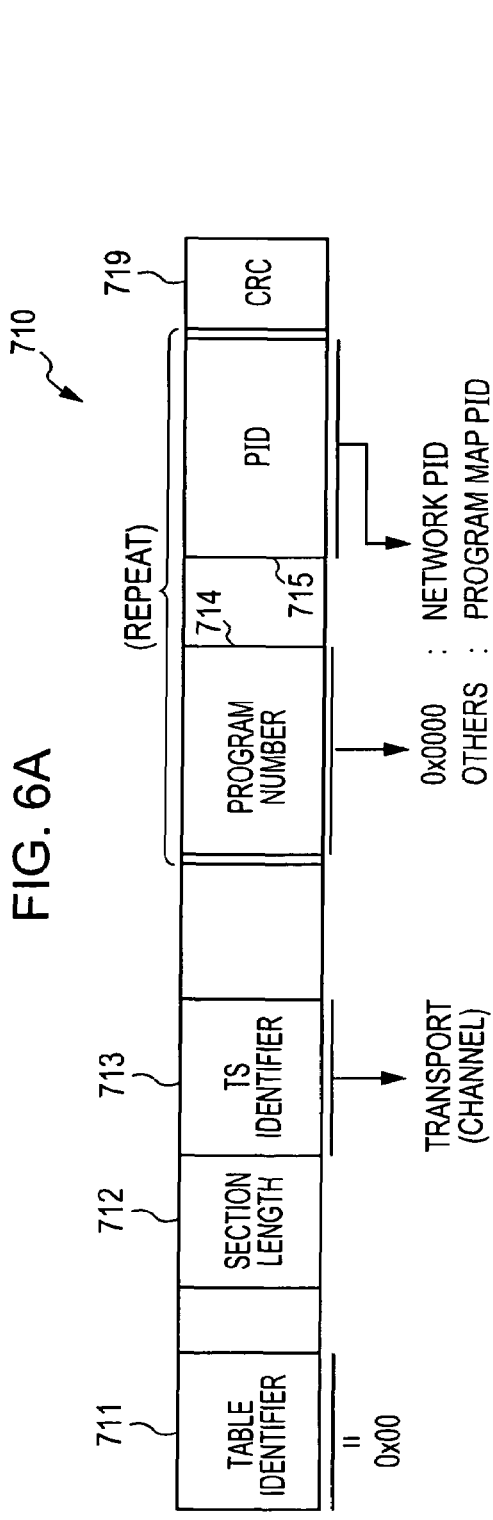
FIGS. 6A and 6B illustrate the configuration of a program association table (PAT) and the configuration of a program map table (PMT), respectively.
Figure 6B:
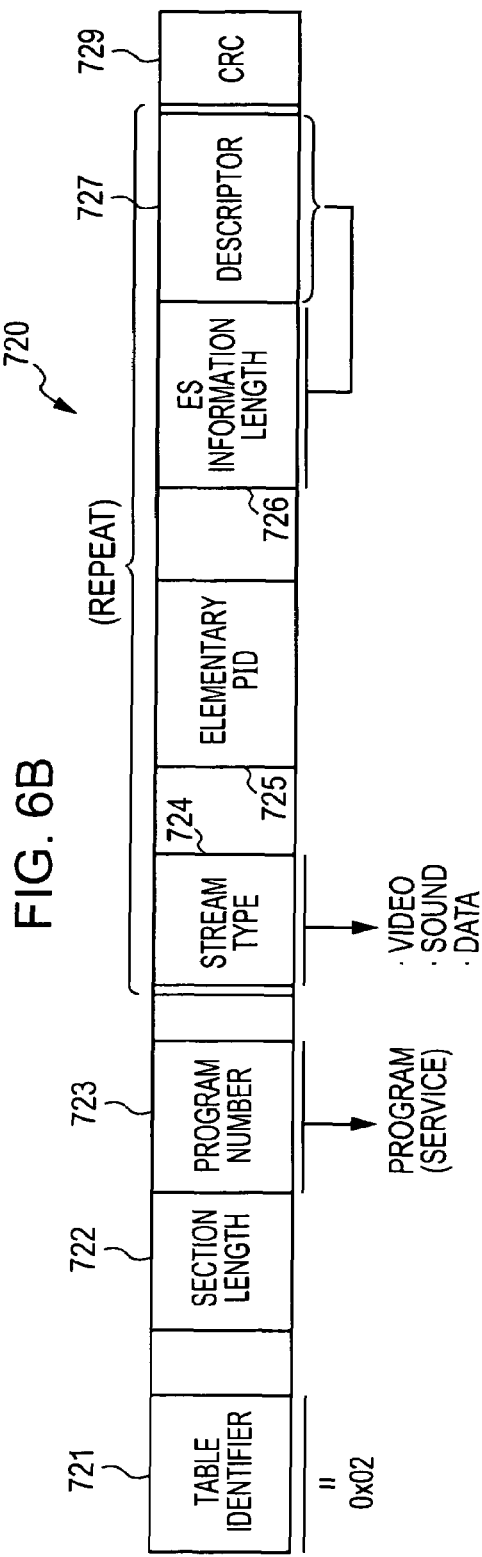

FIGS. 6A and 6B illustrate the program association table (PAT) 710 and the program map table (PMT) 720, respectively. In FIG. 6A, a table identifier 711 indicates 0x00. A section length 712 represents the byte length from the portion immediately after the table identifier 711 to the end of the program association table (PAT) 710. A TS identifier 713 is to identify the transport stream and corresponds to a transponder in satellite communication.

A set of a program number 714 and a PID 715 in a repeat portion indicates a program contained in the transport stream identified by the TS identifier 713. The program number 714 is a number identifying the program (service). The PID 715 indicates the PID of the program map table (PMT) 720 corresponding to the program number 714. If the program number 714 is 0x0000, however, the PID 715 indicates the PID of the network information table (NIT) 730. A cyclic redundancy check (CRC) 719 is an error detection code, and the CRC value that becomes 0 after processing the entire section (in this case, the PAT 710) is selected as the CRC 719.

In the program map table (PMT) 720 shown in FIG. 6B, a table identifier 721 is 0x02. A section length 722 indicates the byte length from the portion immediately after the table identifier 721 to the end of the program map table (PMT) 720, as in the section length 712. A program number 723 is a number identifying the program (service), as in the program number 714.

A repeat portion indicates the content of the program identified by the program number 723. A stream type 724 indicates the type of signal to be transmitted, such as a video, audio, or data signal. An elementary PID 725 designates the packet PID of an elementary stream (ES). An ES information length 726 represents the length of a descriptor 727 disposed immediately after the ES information length 726. The descriptor 727 indicates information concerning the ES. A CRC 729 after the repeat portion stores an error detection code, as in the CRC 719.

As described above, the program association table (PAT) 710 specifies the program map table (PMT) 720, and the program map table (PMT) 720 specifies the video signal 771, the audio signal 772, and the data signal 773, i.e., the double indirect designation method is used. The related data acquisition unit 310 acquires the data signal 773 by the PID obtained as described above.

FIG. 7A illustrates the configuration of the network information table (NIT) 730. A table identifier 731 indicates 0x40 if information concerns the network containing the transport stream 700 or indicates 0x41 if information concerns another network. A section length 732 represents the byte length from the portion immediately after the table identifier 731 to the end of the network information table (NIT) 730, as in the section length 712 or 722. A network identifier 733 is to identify the network. A version number 734 indicates the version number of information contained in the network information table (NIT) 730.

A TS loop length 740 indicates the byte number of the repeat portion disposed immediately after the TS length 740. In the repeat portion, information concerning each transport stream (in this case, the transport stream 700) is indicated. A TS identifier 741 is to identify the transport stream, as in the TS identifier 713 of the program association table (PAT) 710. An original network identifier 742 indicates the network identifier of the original distribution system, and if the network information table (NIT) 730 is transmitted from the network which has generated the transport stream, the original network identifier 742 is the same as the network identifier 733.

A TS descriptor length 743 represents the entire byte length of a descriptor 744 disposed immediately after the TS descriptor length 743. The descriptor 744, which indicates information concerning the network, includes a descriptor concerning the distribution system of the network and a descriptor concerning the service (program) to be provided. A CRC 739 after the repeat portion stores an error detection code, as in the CRC 719 or 729.

FIG. 7B illustrates the configuration of a service list descriptor 760 contained in the descriptor 744 of the network information table (NIT) 730. A descriptor tag 761 indicates 0x41. A descriptor length 762 indicates the data length of the descriptor.

In the repeat portion, information concerning the corresponding service (program) to be provided in the transport stream identified by the TS identifier 741 of the network information table (NIT) 730 is indicated. A service identifier 763, which is to identify the service to be provided, is similar to the program number 714 of the program association table (PAT) 710 or the program number 723 of the program map table (PMT) 720. A service type 764, which indicates the type of service, is similar to the stream type 724 of the program map table (PMT) 720.

In the descriptor 744 of the network information table (NIT) 730, the service identifier (SID) 763 of the service list descriptor 760 is provided for each transport stream (channel).

Figure 8A:
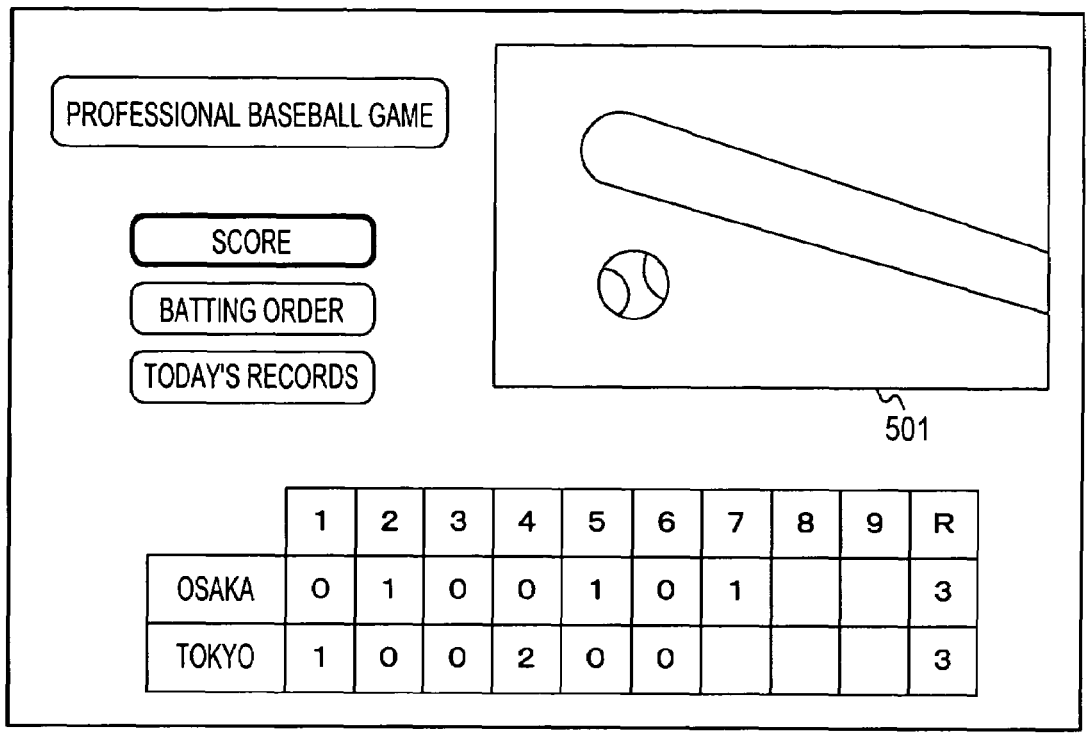
FIGS. 8A and 8B illustrate an example of a related data display screen and an example of a supplementary screen, respectively, in an embodiment of the present invention.
Figure 8B:
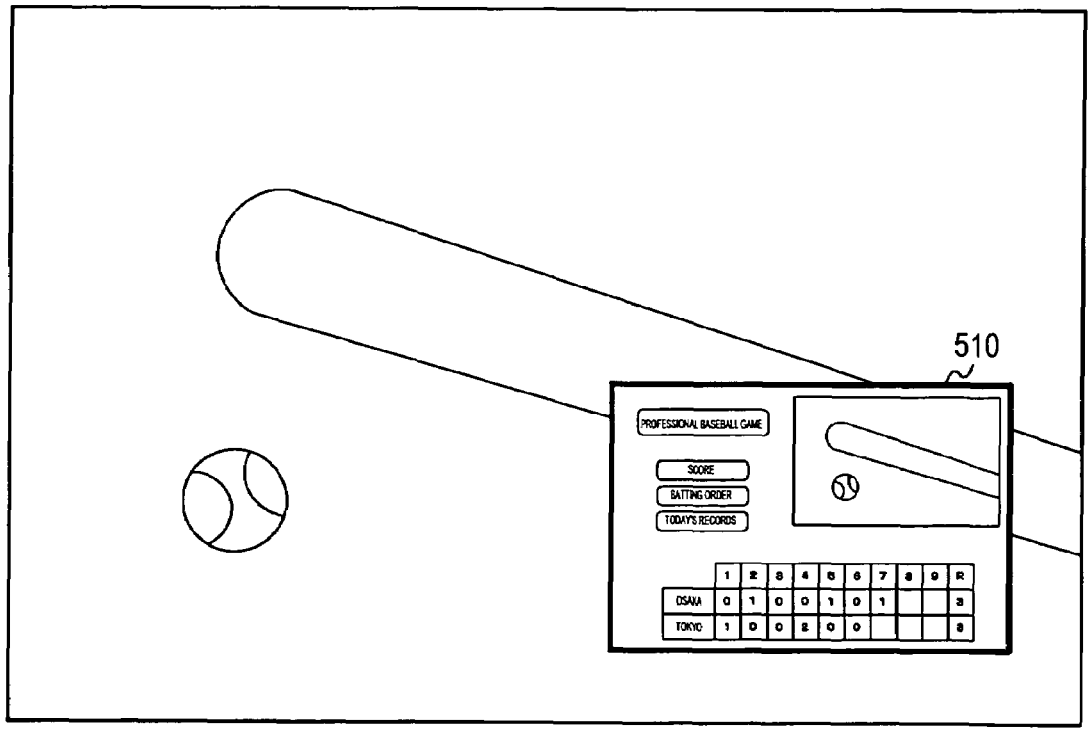

FIGS. 8A and 8B illustrate screen display examples in this embodiment of the present invention. FIG. 8A illustrates an example of the related data display screen displayed on the display unit when a sufficient time has passed after the related data button 241 is pressed. In this example, a score in a professional baseball game is indicated when the "score" button is selected from the "score", "batting order", and "today's records" buttons. In this example, a screen window 501 of the broadcast program is displayed at the top right of the screen.

FIG. 8B illustrates an example of a related data supplementary screen 510 in this embodiment for the display of the broadcast program which is currently received. The supplementary screen 510 indicates an overview of the related data display screen shown in FIG. 8A, and, for example, a thumbnail image, can be used as the supplementary screen 510. As the supplementary screen 510, the supplementary screen of a channel that is being received is selected among the supplementary screens stored in the related data buffer 330.

The display timing of the supplementary screen 510 can be selected as desired, for example, when the screen display button 242, the input switch button 220, the volume button 260, the numeric button 230, or the channel button 270 is pressed, or when the program is shifted to a commercial or is returned from a commercial. The supplementary screen 510 can be erased after the lapse of a few seconds after the supplementary screen 510 is displayed. Displaying the supplementary screen 510 allows the user to recognize the presence of the related data and instructs the user to press the related data button 241, thereby facilitating the use of the related data.

Since the supplementary screen 510 is stored in the related data buffer 330, it can be displayed immediately whenever the channel is switched. In a known receiving device, if the related data button is pressed shortly after the channel is switched, a message "data is now obtained" is merely displayed before the screen is switched to the related data display screen. According to the embodiment of the present invention, however, the supplementary screen 510 is immediately displayed, which allows the user to understand the overview of the related data display screen to be subsequently displayed. In this case, a message "the related data display screen is appearing soon" may be displayed.

As the supplementary screen 510, a reduced size of the related data display screen can be used. A moving picture can be displayed in a moving picture display portion contained in the supplementary screen 510 according to the content of the program, in which case, part of text or an image can be scrolled, or animation produced by, for example, Flash, can be displayed. However, if a load is high for the video decoder 131, a still image can be displayed instead of a moving picture, in which case, a still image stored in the buffer may be used. Alternatively, a still image obtained immediately before the supplementary screen 510 is displayed may be used.

Figure 9:
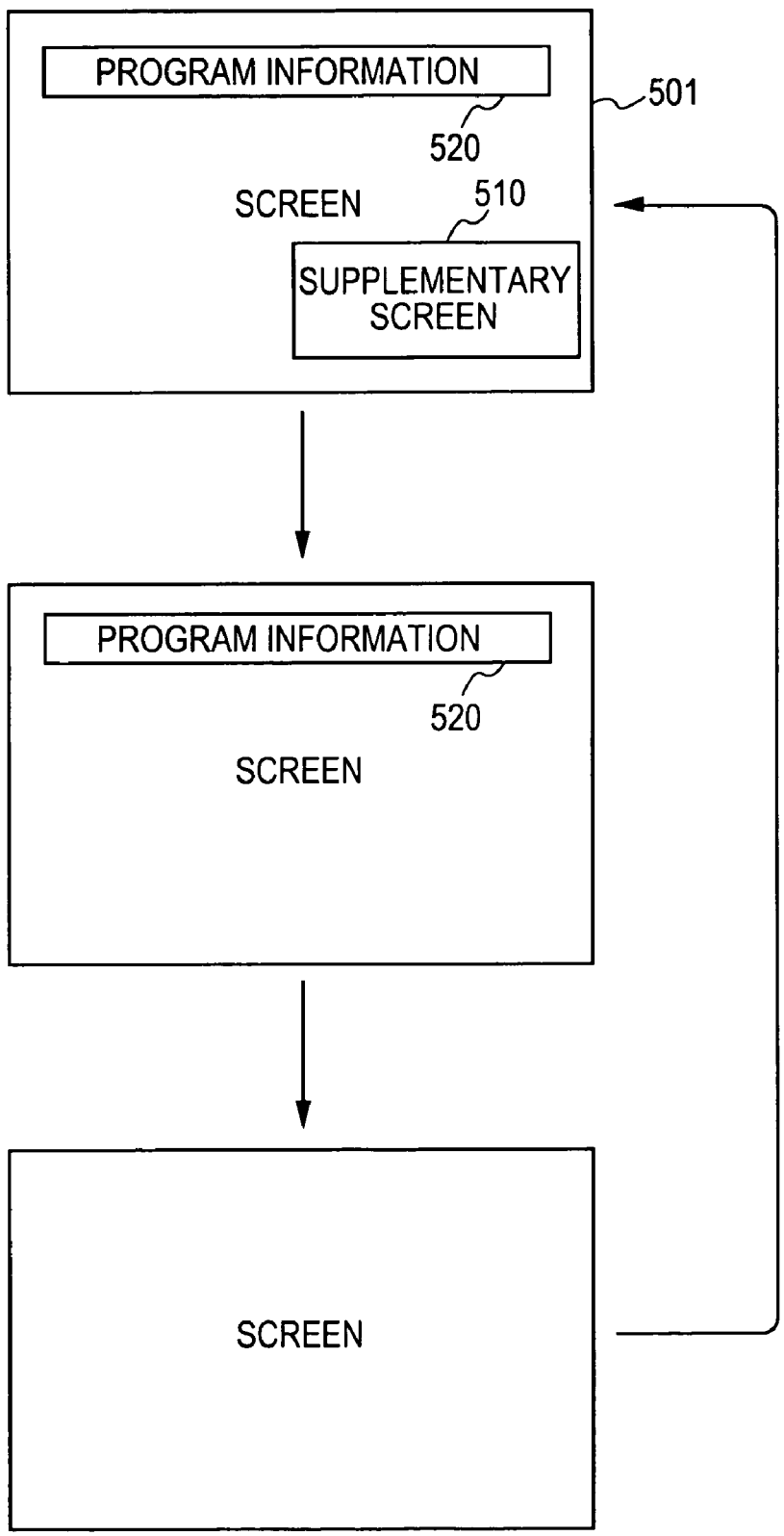
FIG. 9 illustrates an example of a screen display mode in an embodiment of the present invention.

FIG. 9 illustrates an example of a screen display mode in this embodiment of the present invention. In a known receiving device, program information can be displayed when the channel is switched or the screen display button is pressed. In this embodiment, however, the supplementary screen 510 may be displayed in addition to program information 520.

In this case, as shown in FIG. 9, the user can select, when the channel is switched (i.e., the numeric button 230 or the channel button 270 is pressed) or when the screen display button 242 is pressed, whether both the program information 520 and the supplementary screen 510 are displayed, or only the program information 520 is displayed, as in a known receiving device, or information is not particularly displayed other than the program screen window 501. This selection can be made by setting the three screens in the order indicated by the arrows in FIG. 9 by pressing the screen display button 242, or by another menu screen.

Figure 10:
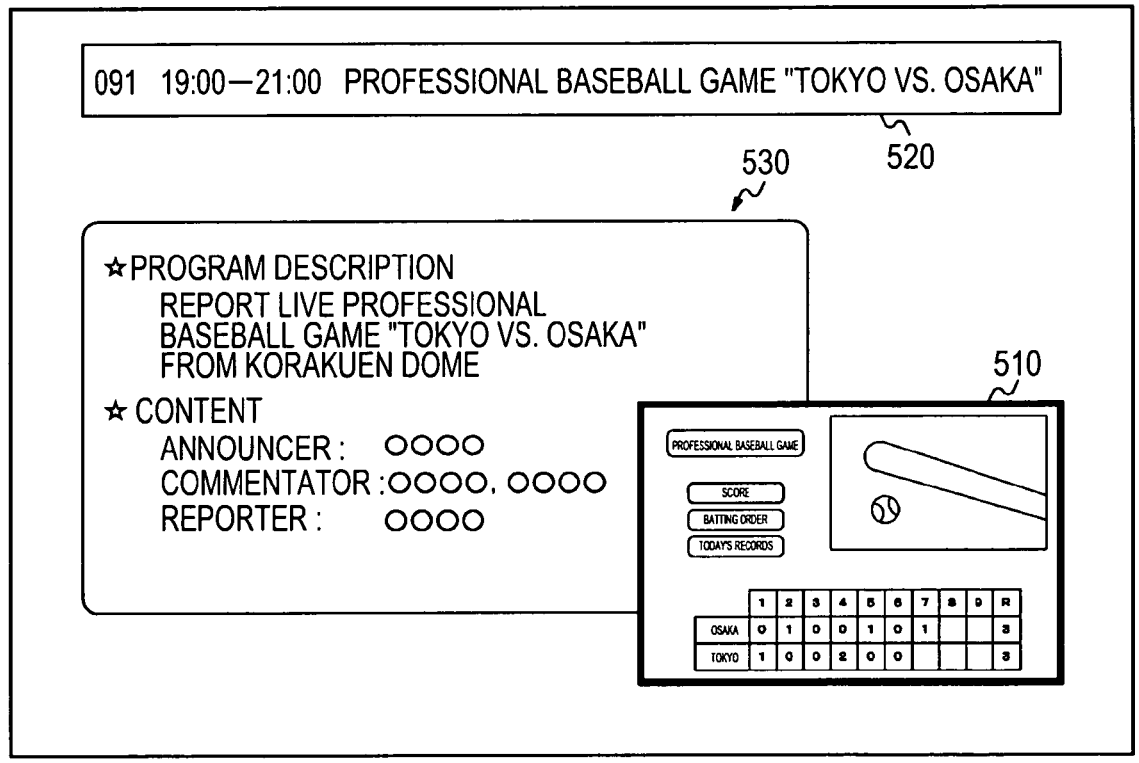
FIG. 10 illustrates another example of the supplementary screen.

FIG. 10 illustrates another display example of the supplementary screen 510 in this embodiment. When the program description button 244 is pressed, detailed information 530 is displayed in addition to the program information 520 concerning the broadcast program. In this case, the supplementary screen 510 may be displayed together. The detailed information 530 is general information concerning the broadcast program, while the related data contains, in most cases, specially prepared detailed information. Displaying both the detailed information 530 and the related data at the same time enhances the usability.

When displaying the supplementary screen 510 together with the detailed information 530, text data contained in the related data may be displayed at the same time. The size of text data in the supplementary screen 510 is reduced and is thus difficult to read, but it can be redisplayed to facilitate the readability. In this case, the entire or part of the text data contained in the related data may be displayed. A scroll bar may be disposed to allow the user to scroll the data, or the data may be automatically scrolled over time.

FIGS. 11A and 11B illustrate other display examples of the supplementary screen 510 in this embodiment. The supplementary screen 510 can be used with a channel list or a title list indicating recorded programs. FIG. 11A illustrates an example in which the supplementary screen 510 in a small size is superimposed on the broadcast program screen window 501 in the channel list. This enables the user to recognize the presence or the image of the broadcast program related data when selecting the channel or the title.

FIG. 11B illustrates an example in which the supplementary screen 510 is disposed next to the broadcast program screen window 501 in the channel list. In this case, the user can recognize the content of the supplementary screen 510 more clearly so that he/she can select the channel or the title more easily.

The operation of the receiving device 100 in this embodiment is described below with reference to FIGS. 12 and 13.

Figure 12:
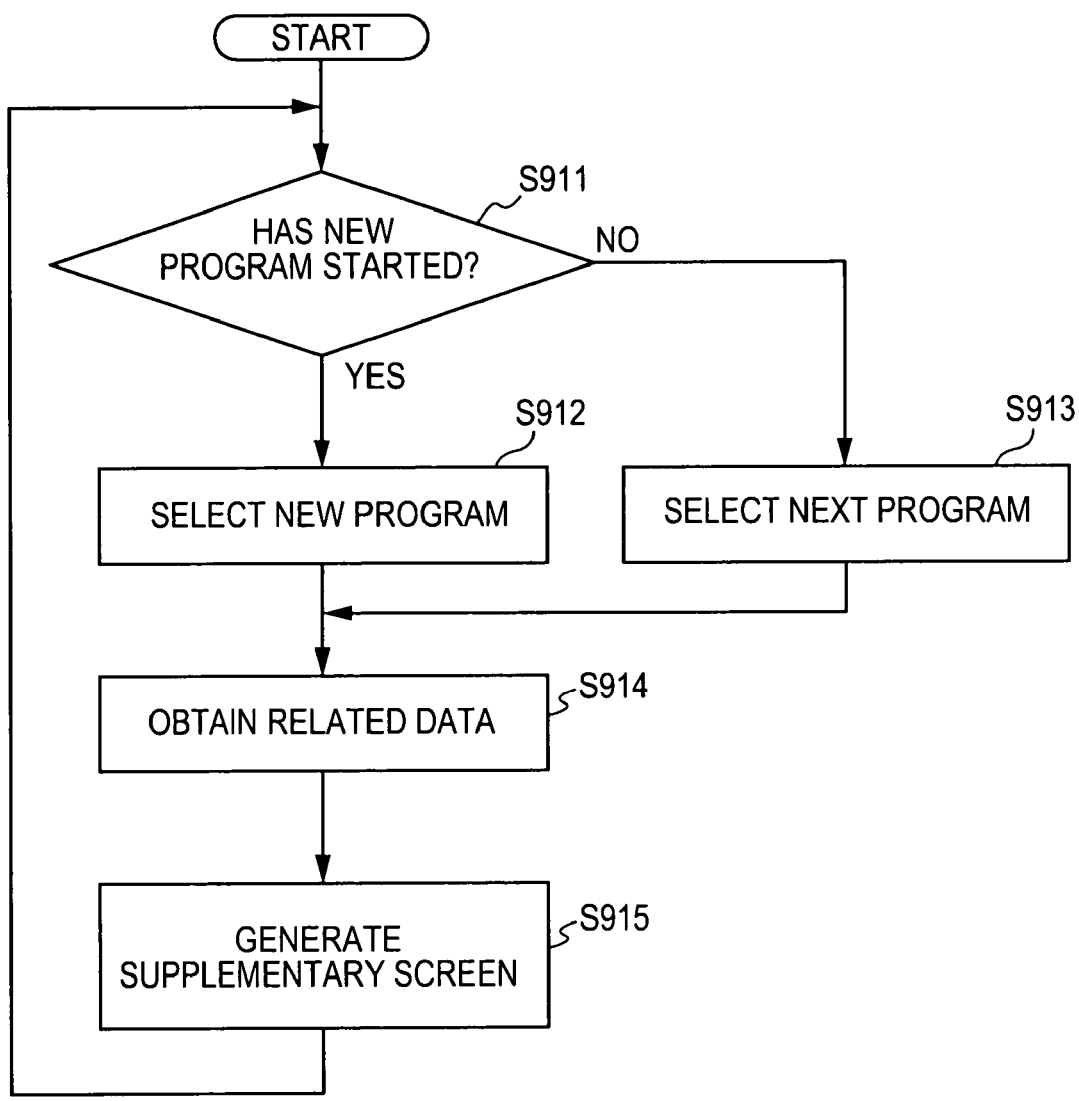
FIG. 12 is a flowchart illustrating related data acquisition control processing in an embodiment of the present invention.

FIG. 12 is a flowchart illustrating the related-data acquisition control processing in this embodiment. In step S911, the related data acquisition unit 310 determines by referring to the EPG 391 whether a new program has started. If it is found in step S911 that a new program has started, the process proceeds to step S912 in which the new program is selected as a program to acquire corresponding related data. If it is found in step S911 that a new program has not started, the process proceeds to step S913 in which the program of the subsequent channel is selected as a program to acquire corresponding related data according to the channel list 392.

In step S914, the related data acquisition unit 310 acquires the related data associated with the program selected in step S912 or S913. Then, in step S915, the supplementary screen generator 320 generates a supplementary screen on the basis of the related data. The generated supplementary screen is then stored in the related data buffer 330.

Thereafter, the process returns to step S911, and the above-described processing is repeated.

Figure 13:
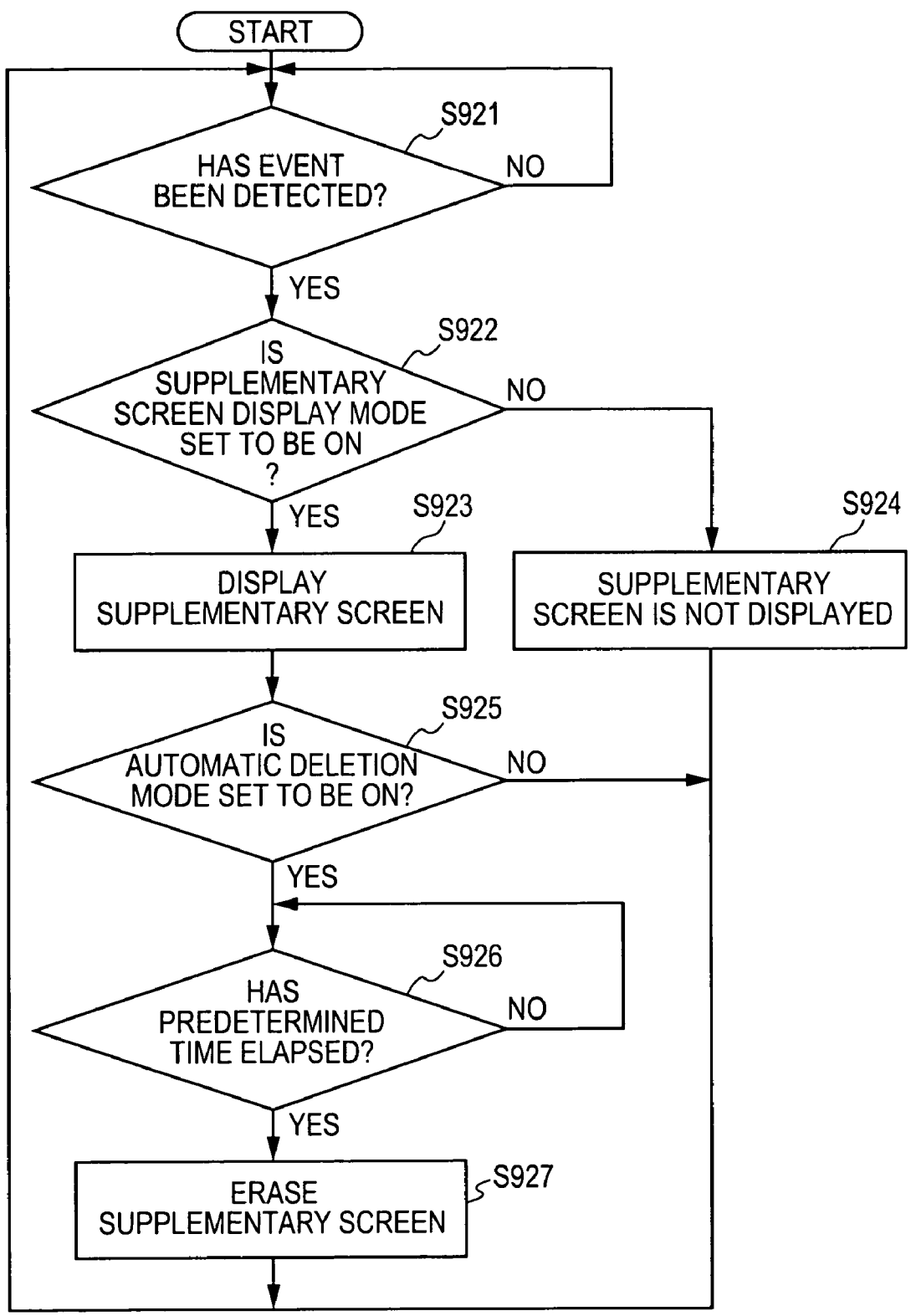
FIG. 13 is a flowchart illustrating display control processing in an embodiment of the present invention.

FIG. 13 is a flowchart illustrating the display control processing in this embodiment.

It is first determined in step S921 whether the event detector 350 has detected a predetermined event. If the predetermined event has been detected in step S921, the display controller 360 starts the display control processing to determine in step S922 whether the supplementary screen display mode stored in the mode storage unit 370 is set to be ON.

If the supplementary screen display mode is found to be ON in step S922, the process proceeds to step S923 in which the display controller 360 displays the supplementary screen 510 on the display unit 380. If the supplementary screen display mode is found to be OFF in step S922, the process proceeds to step S924 in which the display controller 360 does not display the supplementary screen 510 on the display unit 380.

After step S923, it is determined in step S925 whether the automatic deletion mode stored in the mode storage unit 370 is set to be ON. If the automatic deletion mode is found to be ON in step S925, the process proceeds to step S926 to determine whether a preset time after the supplementary screen 510 is displayed has elapsed. If the preset time has elapsed in step S926, the process proceeds to step S927 in which the supplementary screen is erased. If the preset time has not elapsed in step S926, the display controller 360 waits until the preset time has elapsed.

After step S927, the process returns to step S921, and the above-described processing is repeated.

As described above, according to this embodiment, the supplementary screen generator 320 generates the supplementary screen 510 based on the related data acquired by the related data acquisition unit 310, and the generated supplementary screen 510 is then stored in the related data buffer 330. Accordingly, the supplementary screen 510 can be displayed on the display unit 380 at any time.

The above-described embodiment is an example only to implement the present invention, and it should be understood by those skilled in the art that various modifications, combinations, sub-combinations and alterations may occur depending on design requirements and other factors insofar as they are within the scope of the appended claims or the equivalents thereof. For example, the correspondence between the features of the claims and the specific elements disclosed in the foregoing embodiment of the present invention is discussed below.

According to an embodiment of the present invention, the related data acquisition unit corresponds to, for example, the related data acquisition unit 310. The supplementary screen generator corresponds to, for example, the supplementary screen generator 320. The related data storage unit corresponds to, for example, the related data buffer 330. The event detector corresponds to, for example, the event detector 350. The display controller corresponds to, for example, the display controller 360.

According to another embodiment of the present invention, the channel list storage unit corresponds to, for example, the channel list 392.

According to another embodiment of the present invention, the program table storage unit corresponds to, for example, the EPG 391.

According to another embodiment of the present invention, the operation input receiver corresponds to, for example, the remote controller 200 or the remote controller photodetector 193.

According to another embodiment of the present invention, the mode storage unit corresponds to, for example, the mode storage unit 370.

According to another embodiment of the present invention, the receiver corresponds to, for example, the front end 110. The related data acquisition unit corresponds to, for example, the related data acquisition unit 310. The supplementary screen generator corresponds to, for example, the supplementary screen generator 320. The related data storage unit corresponds to, for example, the related data buffer 330. The event detector corresponds to, for example, the event detector 350. The display controller corresponds to, for example, the display controller 360.

According to another embodiment of the present invention, the display unit corresponds to, for example, the display unit 380.

According to another embodiment of the present invention, the step of acquiring related data of a predetermined channel from a broadcast signal corresponds to, for example, step S914. The step of generating a supplementary screen indicating an overview of a related data display screen on the basis of the related data corresponds to, for example, step S915. The step of storing the generated supplementary screen corresponds to, for example, step S915. The step of detecting a predetermined event corresponds to, for example, step S921. The step of controlling the stored supplementary screen to be displayed upon detecting a predetermined event corresponds to, for example, step S923.

The steps described in the above-described embodiment may be implemented by a method including those steps or by a program allowing a computer to execute those steps or a recording medium recording the program thereon.

What is claimed is:

1. A display control device comprising:
a related data acquisition unit acquiring related data of a predetermined channel from a broadcast signal;
a supplementary screen generator generating a supplementary screen indicating an overview of a related data display screen on the basis of the related data;
a related data storage unit storing the supplementary screen generated by the supplementary screen generator;
an event detector detecting a predetermined event;
a display controller controlling the supplementary screen stored in the related data storage unit to be displayed upon detecting the predetermined event by the event detector;
a channel list storage unit storing a channel list of channels included in the broadcast signal, wherein the related data acquisition unit acquires related data according to the channel list stored in the channel list storage unit; and
a program table storage unit storing a program table included in the broadcast signal, wherein, when acquiring related data according to the channel list stored in the channel list storage unit, if a predetermined time has reached to start a new program, the related data acquisition unit preferentially acquires related data of a channel containing the new program.

2. The display control device according to claim 1, wherein the predetermined channel also includes a channel other than a channel which is being received.

3. The display control device according to claim 1, further comprising:
an operation input receiver receiving an input of an operation, wherein the event detector detects the predetermined event in accordance with the input of an operation received by the operation input receiver.

4. A display control device comprising:
a related data acquisition unit acquiring related data of a predetermined channel from a broadcast signal;
a supplementary screen generator generating a supplementary screen indicating an overview of a related data display screen on the basis of the related data;
a related data storage unit storing the supplementary screen generated by the supplementary screen generator;
an event detector detecting a predetermined event;
a display controller controlling the supplementary screen stored in the related data storage unit to be displayed upon detecting the predetermined event by the event detector; and
an operation input receiver receiving an input of an operation, wherein the event detector detects the predetermined event in accordance with the input of an operation received by the operation input receiver, wherein the event detector detects the predetermined event when a screen display button in the operation input receiver is pressed.

5. A display control device comprising:
a related data acquisition unit acquiring related data of a predetermined channel from a broadcast signal;
a supplementary screen generator generating a supplementary screen indicating an overview of a related data display screen on the basis of the related data;
a related data storage unit storing the supplementary screen generated by the supplementary screen generator;
an event detector detecting a predetermined event;
a display controller controlling the supplementary screen stored in the related data storage unit to be displayed upon detecting the predetermined event by the event detector; and
an operation input receiver receiving an input of an operation, wherein the event detector detects the predetermined event in accordance with the input of an operation received by the operation input receiver, wherein the event detector detects the predetermined event when an input switch button in the operation input receiver is pressed.

6. A display control device comprising:
a related data acquisition unit acquiring related data of a predetermined channel from a broadcast signal;
a supplementary screen generator generating a supplementary screen indicating an overview of a related data display screen on the basis of the related data;
a related data storage unit storing the supplementary screen generated by the supplementary screen generator;
an event detector detecting a predetermined event;

a display controller controlling the supplementary screen stored in the related data storage unit to be displayed upon detecting the predetermined event by the event detector; and an operation input receiver receiving an input of an operation, wherein the event detector detects the predetermined event in accordance with the input of an operation received by the operation input receiver, wherein the event detector detects the predetermined event when a volume button in the operation input receiver is pressed.

7. A display control device comprising:

a related data acquisition unit acquiring related data of a predetermined channel from a broadcast signal;

a supplementary screen generator generating a supplementary screen indicating an overview of a related data display screen on the basis of the related data;

a related data storage unit storing the supplementary screen generated by the supplementary screen generator;

an event detector detecting a predetermined event;

a display controller controlling the supplementary screen stored in the related data storage unit to be displayed upon detecting the predetermined event by the event detector; and an operation input receiver receiving an input of an operation, wherein the event detector detects the predetermined event in accordance with the input of an operation received by the operation input receiver, wherein the event detector detects the predetermined event when a numeric button or a channel button in the operation input receiver is pressed.

8. A display control device comprising:

a related data acquisition unit acquiring related data of a predetermined channel from a broadcast signal;

a supplementary screen generator generating a supplementary screen indicating an overview of a related data display screen on the basis of the related data;

a related data storage unit storing the supplementary screen generated by the supplementary screen generator;

an event detector detecting a predetermined event; and a display controller controlling the supplementary screen stored in the related data storage unit to be displayed upon detecting the predetermined event by the event detector, wherein the event detector detects the predetermined event when a program which is being received is shifted to a commercial or is returned from a commercial.

9. A display control device comprising:

a related data acquisition unit acquiring related data of a predetermined channel from a broadcast signal;

a supplementary screen generator generating a supplementary screen indicating an overview of a related data display screen on the basis of the related data;

a related data storage unit storing the supplementary screen generated by the supplementary screen generator;

an event detector detecting a predetermined event;

a display controller controlling the supplementary screen stored in the related data storage unit to be displayed upon detecting the predetermined event by the event detector; and a mode storage unit storing a display mode for displaying the supplementary screen, wherein the display controller displays the supplementary screen only when the display mode indicates that the supplementary screen is to be displayed.

10. A display control device comprising:

a related data acquisition unit acquiring related data of a predetermined channel from a broadcast signal;

a supplementary screen generator generating a supplementary screen indicating an overview of a related data display screen on the basis of the related data;

a related data storage unit storing the supplementary screen generated by the supplementary screen generator;

an event detector detecting a predetermined event;

a display controller controlling the supplementary screen stored in the related data storage unit to be displayed upon detecting the predetermined event by the event detector; and a mode storage unit storing a display mode for displaying the supplementary screen, wherein the display controller displays the supplementary screen only when the display mode indicates that the supplementary screen is to be displayed, wherein, when the display mode indicates that the supplementary screen is to be automatically erased, the display controller erases the supplementary screen after a predetermined lapse of time.

11. A receiving device comprising:

a receiver receiving a broadcast signal;

a related data acquisition unit acquiring related data of a predetermined channel from the broadcast signal;

a supplementary screen generator generating a supplementary screen indicating an overview of a related data display screen on the basis of the related data;

a related data storage unit storing the supplementary screen generated by the supplementary screen generator;

an event detector detecting a predetermined event;

a display controller controlling the supplementary screen stored in the related data storage unit to be displayed upon detecting the predetermined event by the event detector;

a channel list storage unit storing a channel list of channels included in the broadcast signal, wherein the related data acquisition unit acquires related data according to the channel list stored in the channel list storage unit; and a program table storage unit storing a program table included in the broadcast signal, wherein, when acquiring related data according to the channel list stored in the channel list storage unit, if a predetermined time has reached to start a new program, the related data acquisition unit preferentially acquires related data of a channel containing the new program.

12. The receiving device according to claim 11, further comprising:

a display unit displaying the supplementary screen under the control of the display controller.

13. A display control method comprising the steps of:

acquiring related data of a predetermined channel from a broadcast signal;

generating a supplementary screen indicating an overview of a related data display screen on the basis of the related data;

storing the generated supplementary screen;

detecting a predetermined event; and controlling the stored supplementary screen to be displayed upon detecting the predetermined event;

storing a channel list of channels included in the broadcast signal, wherein the acquired related data is acquired according to the stored channel list; and storing a program table included in the broadcast signal, wherein, when acquiring related data according to the stored channel list, if a predetermined time has reached to start a new program, the acquired related data corresponds to related data of a channel containing the new program.

14. A computer-readable recording medium for storing a computer program that allows a computer to execute the steps of:
   acquiring related data of a predetermined channel from a broadcast signal;
   generating a supplementary screen indicating an overview of a related data display screen on the basis of the related data;
   storing the generated supplementary screen;
   detecting a predetermined event;
   controlling the stored supplementary screen to be displayed upon detecting the predetermined event;
   storing a channel list of channels included in the broadcast signal,
   wherein the acquired related data is acquired according to the stored channel list; and
   storing a program table included in the broadcast signal, wherein, when acquiring related data according to the stored channel list, if a predetermined time has reached to start a new program, the acquired related data corresponds to related data of a channel containing the new program.

* * * * *

UNITED STATES PATENT AND TRADEMARK OFFICE
CERTIFICATE OF CORRECTION

PATENT NO. : 7,619,688 B2
APPLICATION NO. : 11/268239
DATED : November 17, 2009
INVENTOR(S) : Taku Inoue It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this

Twenty-sixth Day of October, 2010

David J. Kappos
*Director of the United States Patent and Trademark Office*